US012341395B2

(12) United States Patent
Tsuchihashi

(10) Patent No.: US 12,341,395 B2
(45) Date of Patent: Jun. 24, 2025

(54) ACTUATOR

(71) Applicant: NIDEC INSTRUMENTS CORPORATION, Nagano (JP)

(72) Inventor: Masao Tsuchihashi, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 235 days.

(21) Appl. No.: 18/268,600

(22) PCT Filed: Dec. 13, 2021

(86) PCT No.: PCT/JP2021/045754
§ 371 (c)(1),
(2) Date: Jun. 20, 2023

(87) PCT Pub. No.: WO2022/138267
PCT Pub. Date: Jun. 30, 2022

(65) Prior Publication Data
US 2024/0048035 A1    Feb. 8, 2024

(30) Foreign Application Priority Data

Dec. 22, 2020 (JP) .................................. 2020-212043

(51) Int. Cl.
*H02K 33/00*    (2006.01)
*H02K 5/04*    (2006.01)
(52) U.S. Cl.
CPC .............. *H02K 33/00* (2013.01); *H02K 5/04* (2013.01)
(58) Field of Classification Search
CPC .......... H02K 33/16; H02K 33/00; H02K 5/04; H02K 33/18; B06B 1/045
See application file for complete search history.

(56) References Cited

U.S. PATENT DOCUMENTS 8,552,605 B2 * 10/2013 Sahara ................. H02K 5/1732
310/91
8,736,121 B2    5/2014 Choi et al.
(Continued)

FOREIGN PATENT DOCUMENTS

CN         107947430        4/2018
EP         3240164          11/2017
(Continued)

OTHER PUBLICATIONS

"International Search Report (Form PCT/ISA/210) of PCT/JP2021/045754", mailed on Feb. 8, 2022, with English translation thereof, pp. 1-4.

*Primary Examiner* — Leda T Pham
(74) *Attorney, Agent, or Firm* — JCIPRNET

(57) ABSTRACT

A case of an actuator includes a cylinder member and a first lid member closing one opening of the cylinder member. A fixing part fixing the first lid member and the cylinder member includes a first protrusion protruding from the first lid member, a second protrusion protruding from the first lid member on a second direction X2 side of the first protrusion, a first recessed part into which the first protrusion is inserted, and a second recessed part into which the second protrusion is inserted. Before the first protrusion is inserted into the first recessed part, a first protrusion width dimension of the first protrusion is larger than a first recessed part width dimension of the first recessed part, and a second protrusion width dimension of the second protrusion is larger than a second recessed part width dimension of the second recessed part.

20 Claims, 5 Drawing Sheets

(56) References Cited

U.S. PATENT DOCUMENTS

| 9,059,623 | B2 | 6/2015 | Choi et al. |
|---|---|---|---|
| 2017/0118411 | A1 | 4/2017 | Morinaga |
| 2017/0302131 | A1 | 10/2017 | Kuroda |
| 2019/0184424 | A1 | 6/2019 | Takeda et al. |
| 2020/0161955 | A1 | 5/2020 | Kitahara et al. |
| 2022/0123644 | A1* | 4/2022 | Kitahara ............... H02K 33/18 |
| 2022/0224213 | A1 | 7/2022 | Kasahara et al. |

FOREIGN PATENT DOCUMENTS

| EP | 3748823 | 12/2020 |
|---|---|---|
| JP | 2017192269 | 10/2017 |
| JP | 2019013086 | 1/2019 |
| JP | 2020195249 | 12/2020 |
| JP | 2020199495 | 12/2020 |
| KR | 101046003 | 7/2011 |
| WO | 2018030269 | 2/2018 |
| WO | 2020241355 | 12/2020 |

* cited by examiner

ACTUATOR

CROSS-REFERENCE TO RELATED APPLICATION

This application is a 371 application of the International PCT application serial no. PCT/JP2021/045754, filed on Dec. 13, 2021, which claims the priority benefits of Japan Patent Application No. 2020-212043, filed on Dec. 22, 2020. The entirety of each of the above-mentioned patent applications is hereby incorporated by reference herein and made a part of this specification.

TECHNICAL FIELD

The present invention relates to an actuator with a movable body vibrating in a case.

BACKGROUND ART

Such an actuator is described in Patent Literature 1. The actuator of the document comprises a support body having a case, a movable body housed in the case, a connecting member connecting the case and the movable body in a relatively movable manner, and a magnetic drive mechanism moving the movable body relative to the support body. The support body includes a holder fixed to the case and a coil held by the holder. The movable body includes a yoke and a magnet that is fixed to the yoke and faces the coil. The connecting member is a viscoelastic body and is disposed between the case and the yoke. The magnetic drive mechanism is composed of the coil of the support body and the magnet of the movable body.

CITATION LIST

Patent Literature

[Patent Literature 1] Japanese Unexamined Patent Application Publication No. 2019-13086

SUMMARY OF THE INVENTION

Problems to be Solved by the Invention

The present inventors have proposed an actuator in which a movable body is housed in a cylindrical case and which causes the movable body to vibrate along a shaft line of the case. In such an actuator, the case includes a cylinder member positioned on the outer circumferential side of the movable body, and a lid member closing an opening in the shaft line direction of the cylinder member. A connecting member that connects the movable body and the support body includes an annular viscoelastic body, an inner frame member fixed to an end face on the inner circumferential side of the viscoelastic body, and an outer frame member fixed to an end face on an outer circumferential side of the viscoelastic body. The connecting member is disposed coaxially with the case. The inner frame member of the connecting member is connected to the movable body. The outer frame member is held, by a holder fixed to the cylinder member, from the radially outer side and from one side of the shaft line direction. The lid member abuts on the outer frame member from the other side of the shaft line direction. The lid member prevents the viscoelastic body from being exposed to the outside of the case and prevents the outer frame member from moving toward the other side of the shaft line direction.

In such an actuator, when impact is applied from the outside due to dropping or the like, external force acts on the movable body, and the movable body moves within the case. In addition, when the movable body moves, force acting on the movable body is transmitted to the lid member via the connecting member. Accordingly, when the actuator is subjected to external impact, a load in the shaft line direction is applied to the lid member. Therefore, such an actuator is required to include a strong fixing part between the cylinder member and the lid member so that the lid member does not drop out of the cylinder member when being subjected to external impact.

In view of the above problem, an object of the present invention is to provide an actuator including a strong fixing part between a cylinder member and a lid member constituting a cylindrical case.

Means for Solving the Problem

In order to solve the above problem, an actuator according to the present invention has: a case provided with a cylinder member and a lid member that is inserted into the cylinder member and closes one opening in a shaft line direction of the cylinder member; a movable body housed in the case; a connecting member connecting the movable body and the case such that the movable body and the case are allowed to relatively move in the shaft line direction; and a magnetic drive mechanism vibrating the movable body in the shaft line direction relative to the case, in which the case includes a plurality of fixing parts fixing the lid member to the cylinder member; when one side of the shaft line direction is taken as a first direction, and the other side of the shaft line direction is taken as a second direction, the lid member includes an abutting part abutting on the connecting member from the first direction side; each fixing part includes a first protrusion protruding toward an outer circumferential side from a portion of the lid member in a circumferential direction, a second protrusion which is on the second direction side of the first protrusion and protrudes toward the outer circumferential side from a portion of the lid member in the circumferential direction, a first recessed part which is provided on an inner circumferential surface of the cylinder member and into which the first protrusion is inserted, and a second recessed part which is provided on the inner circumferential surface of the cylinder member and into which the second protrusion is inserted; a pair of first end faces located on respective sides in the circumferential direction of the first protrusion are in contact with a pair of first side walls of the first recessed part facing in the circumferential direction, respectively; a pair of second end faces located on respective sides in the circumferential direction of the second protrusion are in contact with a pair of second side walls of the second recessed part facing in the circumferential direction, respectively; a first contact area in which the first end faces are respectively in contact with the first side walls is larger than a second contact area in which the second end faces are respectively in contact with the second side walls; and before the first protrusion is inserted into the first recessed part, a first protrusion width dimension between the pair of first end faces in the circumferential direction is larger than a first recessed part width dimension between the pair of first side walls in the circumferential direction, and a second protrusion width dimension between the pair of second end faces in the circumferential direction is larger than a second recessed part width dimension between the pair of second side walls in the circumferential direction.

In the present invention, the lid member is provided with the first protrusion and the second protrusion protruding toward the outer circumferential side, and the first recessed part into which the first protrusion is inserted and the second recessed part into which the second protrusion is inserted are provided on the inner circumferential surface of the cylinder member. In addition, before the first protrusion is inserted into the first recessed part, the first protrusion width dimension of the first protrusion is larger than the first recessed part width dimension of the first recessed part, and the second protrusion width dimension of the second protrusion is larger than the second recessed part width dimension of the second recessed part. Accordingly, when the lid member is inserted into the cylinder member to fix same, the first protrusion is press-fitted into the first recessed part, and the second protrusion is press-fitted into the second recessed part, in each fixing part. Accordingly, the plurality of fixing parts make it possible to provide strength enough to prevent the lid member from dropping out of the cylinder member. In addition, each fixing part is provided with two press-fit portions. Accordingly, even in a case where the first protrusion or the second protrusion is broken due to external impact, and the number of press-fit portions becomes one, the lid member can be prevented from dropping out of the cylinder member. Furthermore, the first contact area in which the first end faces of the first protrusion are in contact with the first side walls of the first recessed part is larger than the second contact area in which the second end faces of the second protrusion are in contact with the second side walls of the second recessed part. Consequently, frictional force between the first end faces of the first protrusion and the first side walls of the first recessed part increases, making it easier to prevent the lid member from falling out of the cylinder member. Here, the actuator has the following problem: when vibration of the movable body is transmitted to the lid member via the connecting member, the lid member rotates around the shaft line due to vibration, and the lid member easily drops out of the cylinder member. On the other hand, in the present invention, the first contact area in which the first end faces of the first protrusion is in contact with the first side walls of the first recessed part is larger than the second contact area in which the second end faces of the second protrusion are in contact with the second side walls of the second recessed part. Accordingly, contact between the first end faces of the first protrusion and the first side walls of the first recessed part can prevent the lid member from rotating relative to the cylinder member and can prevent the lid member from easily dropping out of the cylinder member.

In addition, in the case where the first end faces of the first protrusion and the second end faces of the second protrusion overlap, and the first side walls of the first recessed part and the second side walls of the second recessed part overlap, when viewed from the shaft line direction, the first end faces of the first protrusion and the second end faces of the second protrusion are aligned on a straight line in the shaft line direction, and the first side walls of the first recessed part and the second side walls of the second recessed part are aligned on a straight line in the shaft line direction. In this case, there is the following problem: when force in the shaft line direction is applied to the lid member, the first protrusion and the second protrusion easily fall out of the first recessed part and the second recessed part in the shaft line direction, respectively. On the other hand, in the present invention, the first end faces and the second end faces can be located in positions different from each other in the circumferential direction, and the first side walls and the second side walls can be located in positions different from each other in the circumferential direction. In this configuration, the first end faces and the second end faces are not aligned on a straight line in the shaft line direction, and the first side walls and the second side walls are not aligned on a straight line in the shaft line direction. Accordingly, the lid member is easily prevented from dropping out of the cylinder member.

In the present invention, the first protrusion width dimension is longer than the second protrusion width dimension, the first recessed part width dimension is longer than the second recessed part width dimension, when viewed from the shaft line direction, the second protrusion is located on an inner side of the first protrusion in the circumferential direction, and the second recessed part is located in the second direction of the first recessed part and can communicate with the first recessed part in the shaft line direction. In this configuration, the first protrusion and the second protrusion are provided in positions overlapping in each fixing part. Accordingly, the first protrusion and the second protrusion can be inserted into the first recessed part and the second recessed part by pushing into each fixing part toward the second direction. In addition, when viewed from the first direction side, the second protrusion is located on the inner side of the first protrusion. Accordingly, the second protrusion and a second groove into which the second protrusion is inserted can be buried by the first protrusion when viewed from the first direction side in the state where the lid member is fixed to the cylinder member.

In the present invention, a first press-fit margin obtaining by subtracting the first recessed part width dimension from the first protrusion width dimension can be set to be equal to or less than a second press-fit margin obtaining by subtracting the second recessed part width dimension from the second protrusion width dimension. In this configuration, strength of each fixing part can be ensured by press-fitting the second protrusion into the second recessed part apart from an opening end of the cylinder member. Therefore, the first lid member hardly drops out of the cylinder member. In addition, deformation of the opening end of the cylinder member caused when the first protrusion is press-fitted into the first recessed part provided on the side closer to the opening end of the cylinder member can be prevented or suppressed thereby.

In the present invention, the first protrusion can protrude toward the outer circumferential side further from the second protrusion, and the first recessed part can be more deeply recessed toward the outer circumferential side than the second recessed part. In this configuration, it is easier to make the first contact area in which the first end faces of the first protrusion in the circumferential direction are in contact with the first side walls of the first recessed part larger than the second contact area in which the second end faces of the second protrusion in the circumferential direction are in contact with the second side walls of the second recessed part. The frictional force between the first end faces of the first protrusion and the first side walls of the first recessed part is made easier to be increased thereby, making it easier to prevent the lid member from falling out of the cylinder member. In addition, since the first contact area between the first end faces of the first protrusion and the first side walls of the first recessed part is increased, the lid member can be prevented from rotating relative to the cylinder member when vibration of the movable body is transmitted to the lid member.

In the present invention, each first end face can be a curved surface when viewed from the shaft line direction, and each first side wall can be a transferred surface having a shape of the curved surface transferred. In this configuration, it is easier to make the first contact area in which the first end faces of the first protrusion are in contact with the first side walls of the first recessed part larger than the second contact area in which the second end faces of the second protrusion are in contact with the second side walls of the second recessed part. The frictional force between the first end faces of the first protrusion and the first side walls of the first recessed part is made easier to be increased thereby, making it easier to prevent the lid member from falling out of the cylinder member. In addition, since the first contact area between the first end faces of the first protrusion and the first side walls of the first recessed part is increased, the lid member can be prevented from rotating relative to the cylinder member when vibration of the movable body is transmitted to the lid member.

In the present invention, three or more fixing parts are desirably provided at equal angular intervals. In this configuration, the plurality of fixing parts makes it easier to ensure strength enough to prevent the lid member from dropping out of the cylinder member.

In the present invention, a holder fixed to an inside of the case is provided, the connecting member includes an annular viscoelastic body spreading in a radial direction, an inner frame member fixed to an end face on an inner circumferential side of the viscoelastic body, and an outer frame member fixed to an end face on an outer circumferential side of the viscoelastic body, the holder holds the outer frame member from the outer circumferential side and from a side in the second direction, the inner frame member is connected to the movable body, and the abutting part abuts on the outer frame member. In this configuration, the outer frame member of the connecting member can be held, by the lid member and the holder constituting the support body, in a state where movement in the shaft line direction is impossible. In addition, the lid body can prevent the viscoelastic body of the connecting member from being exposed to the outside of the case.

Effect of the Invention

In the present invention, the first protrusion and the second protrusion provided to the lid member are press-fitted into a first groove and a second groove provided on the inner circumferential surface of the cylinder member. Accordingly, the plurality of fixing parts fixing the lid member and the cylinder member makes it possible to provide strength enough to prevent the lid member from dropping out of the cylinder member. In addition, each fixing part is provided with two press-fit portions. Accordingly, even in a case where the first protrusion or the second protrusion is broken due to external impact, and the number of press-fit portions becomes one, the lid member can be prevented from dropping out of the cylinder member. Furthermore, the first contact area in which the first end faces of the first protrusion are in contact with the first side walls of the first recessed part is larger than the second contact area in which the second end faces of the second protrusion are in contact with the second side walls of the second recessed part. Consequently, frictional force between the first end faces of the first protrusion and the first side walls of the first recessed part increases, making it easier to prevent the lid member from falling out of the cylinder member. In addition, the lid member can be prevented from rotating relative to the cylinder member.

MODE FOR CARRYING OUT THE INVENTION

Overall Configuration

Figure 1:
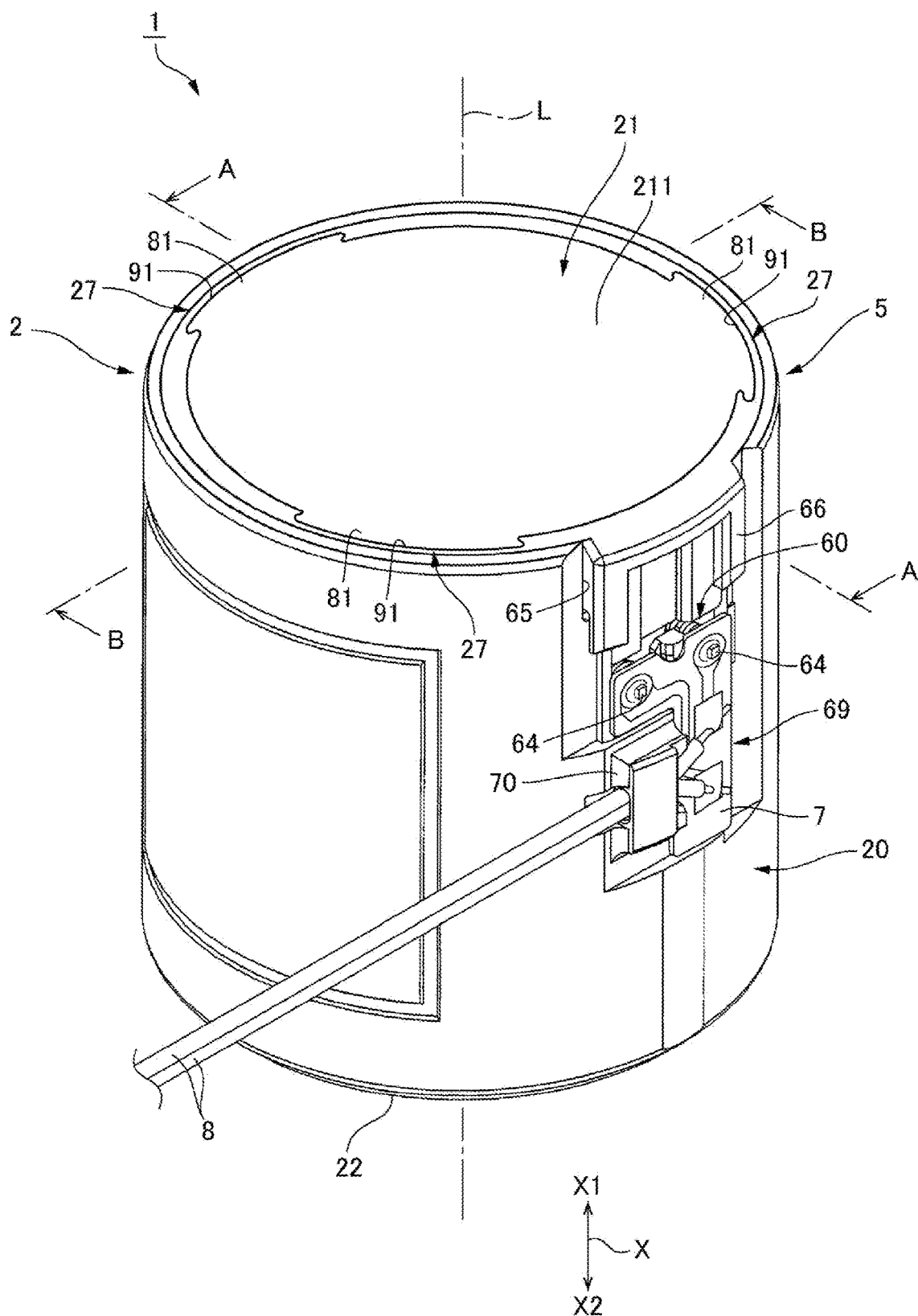
FIG. 1 is a perspective view of an actuator according to an embodiment of the present invention.
Figure 2:
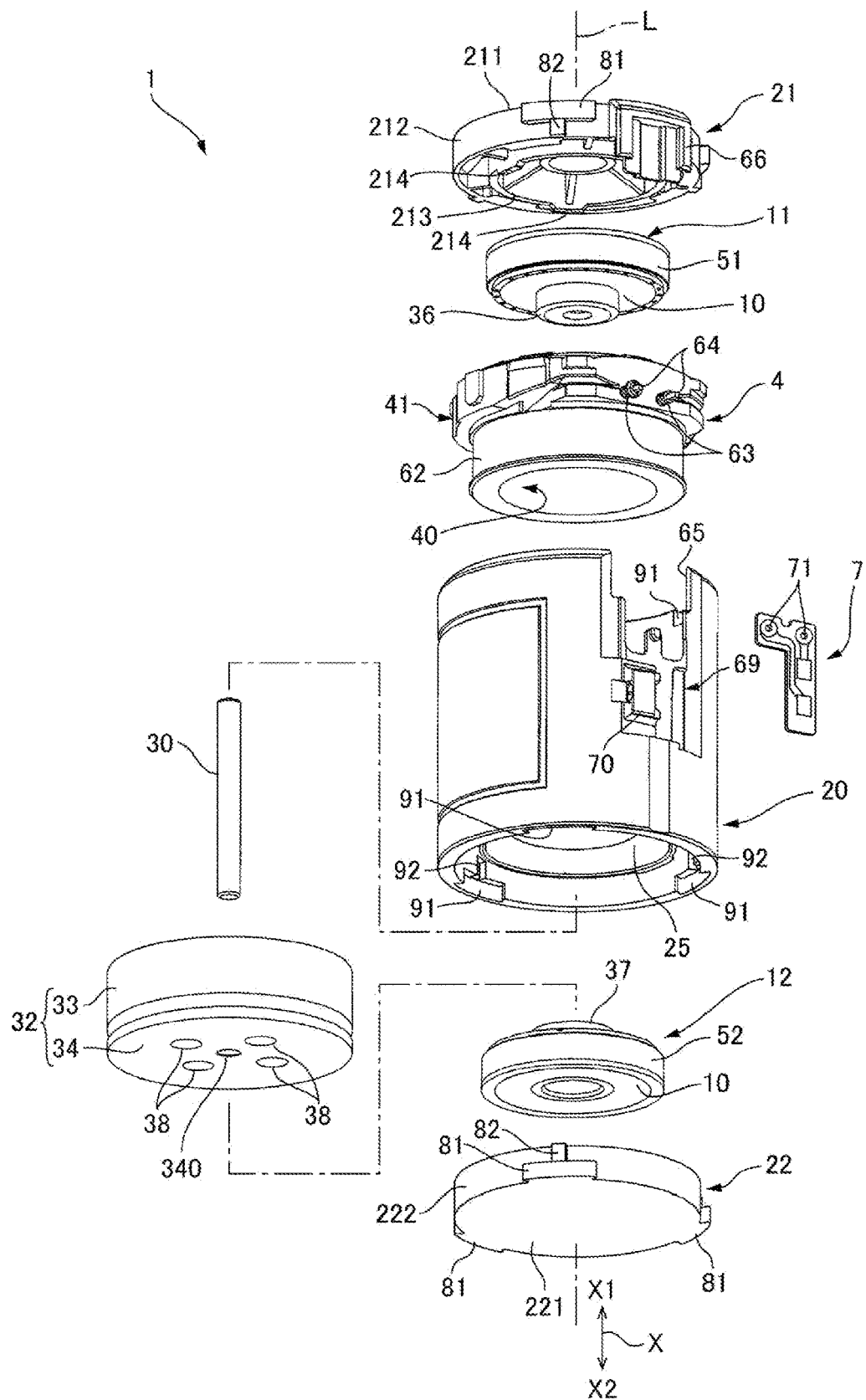
FIG. 2 is an exploded perspective view of the actuator.
Figure 3:
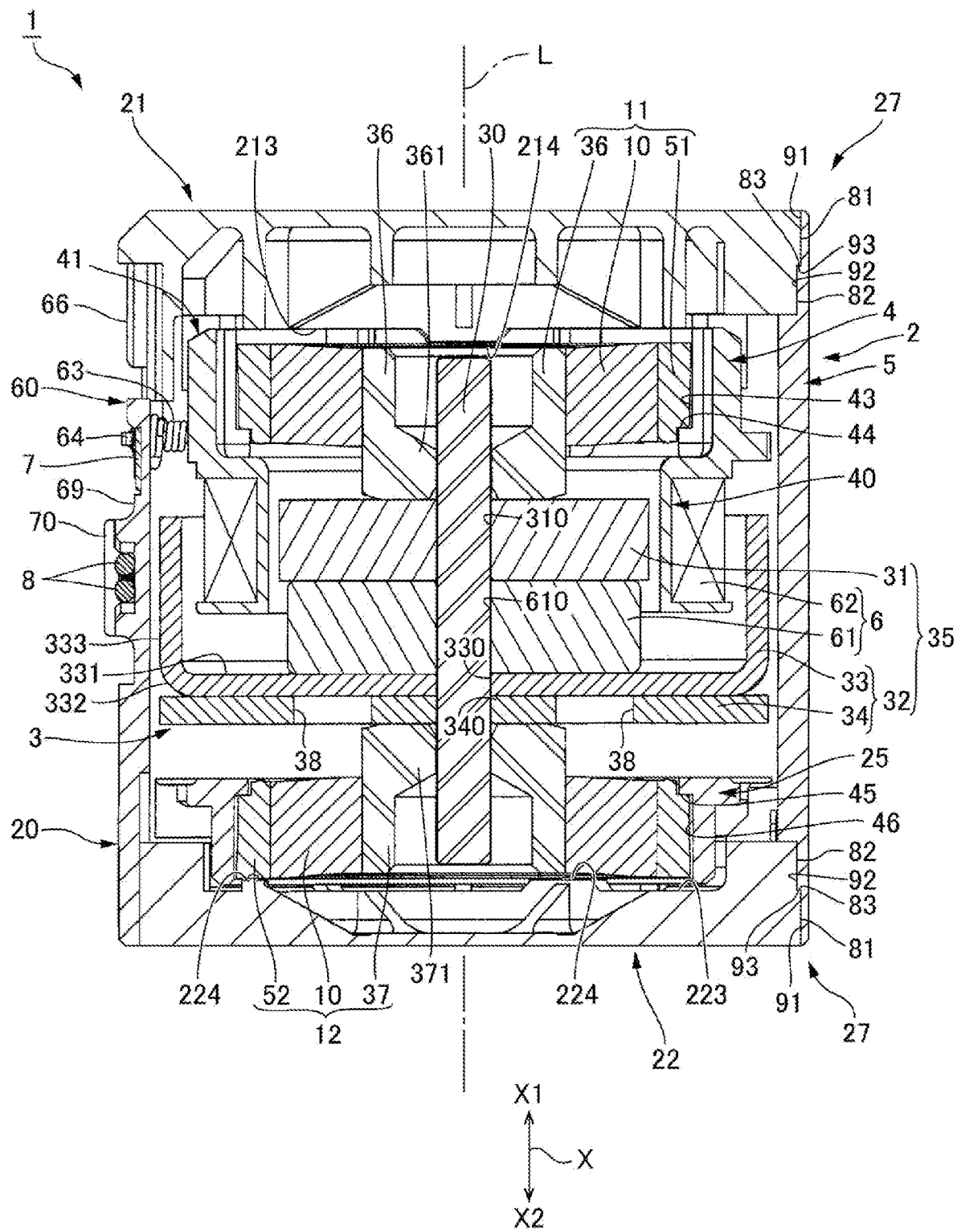
FIG. 3 is a cross-sectional view taken along the line A-A in FIG. 1.
Figure 4:
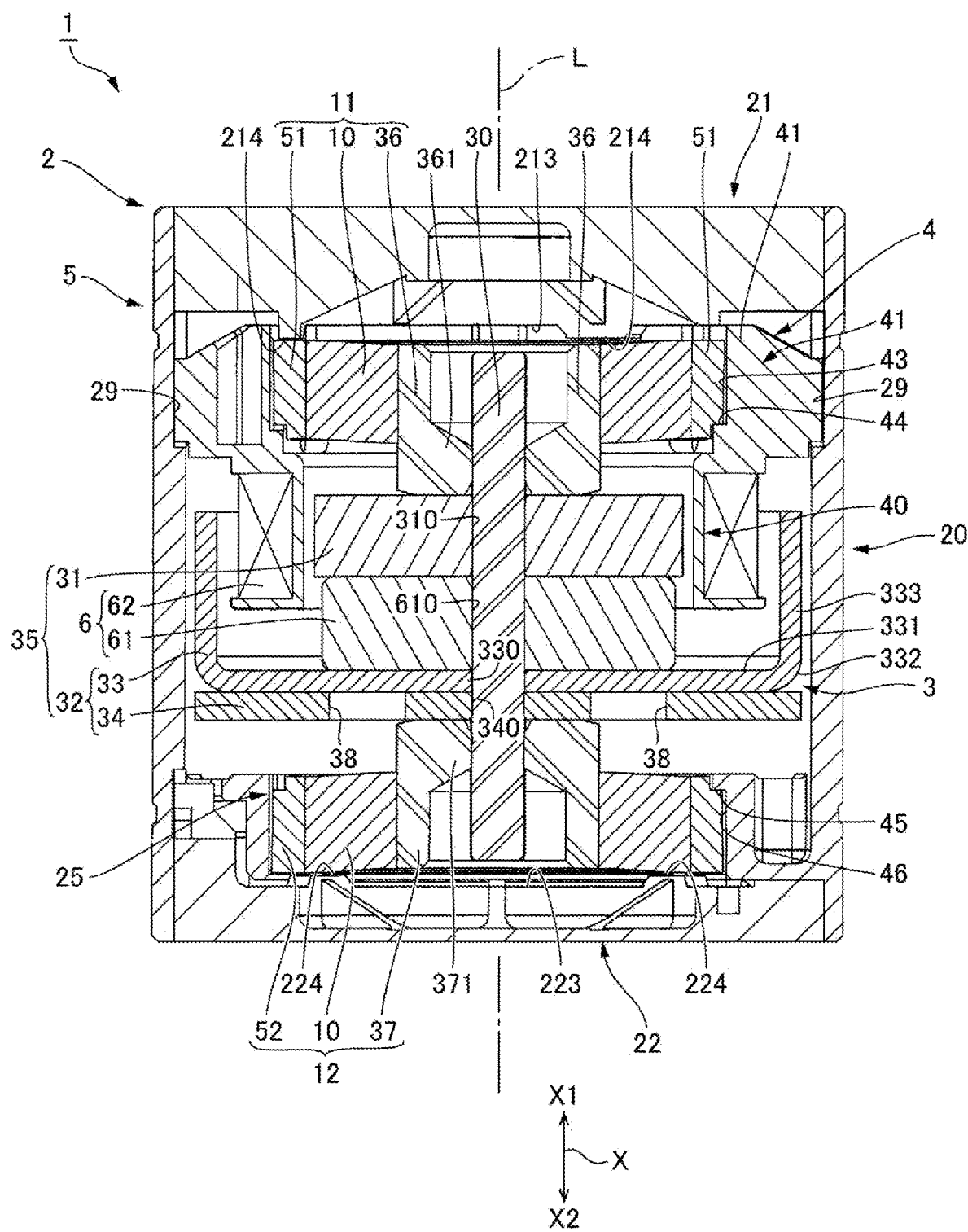
FIG. 4 is a cross-sectional view taken along the line B-B in FIG. 1.

Hereinafter, an embodiment of the present invention will be described with reference to drawings. FIG. 1 is a perspective view of an actuator 1 according to an embodiment of the present invention. FIG. 2 is an exploded perspective view of the actuator 1 illustrated in FIG. 1. FIG. 3 and FIG. 4 are cross-sectional views of the actuator 1 illustrated in FIG. 1. FIG. 3 is a cross-sectional view cut along the line A-A in FIG. 1. FIG. 4 is a cross-sectional view cut along the line B-B in FIG. 1. FIG. 4 is a cross-sectional view cut in the direction perpendicular to FIG. 3.

As illustrated in FIG. 1, the actuator 1 has a cylindrical appearance. As illustrated in FIG. 3 and FIG. 4, the actuator 1 includes a support body 2 having a cylindrical case 5, a movable body 3 housed in the case 5, and a first connecting member 11 and a second connecting member 12 that connect the support body 2 and the movable body 3 such that the movable body 3 and the case 5 are allowed to relatively move in a shaft line direction X along the shaft line L of the case 5. The first connecting member 11 connects the movable body 3 and the support body 2 in one end part in the shaft line direction X inside the case 5. The second connecting member 12 connects the movable body 3 and the support body 2 in the other end part in the shaft line direction inside the case 5.

In addition, the actuator 1 includes a magnetic drive mechanism 6 that moves the movable body 3 in the shaft line direction X. The magnetic drive mechanism 6 includes a magnet 61 disposed in the movable body 3 and a coil 62 disposed in the support body 2. In the following description, one side of the shaft line direction X is taken as a first direction X1, and the other side of the shaft line direction X is taken as a second direction X2.

First Connecting Member and Second Connecting Member

As illustrated in FIG. 2, the first connecting member 11 includes an annular viscoelastic body 10, a first inner frame member 36 fixed to an end face on the inner circumferential side of the viscoelastic body 10, and a first outer frame member 51 fixed to an end face on the outer circumferential side of the viscoelastic body 10. The viscoelastic body 10 is joined to the first inner frame member 36 and the first outer frame member 51 with stickiness of the viscoelastic body 10 itself. The first inner frame member 36 is fixed to the movable body 3, and the first outer frame member 51 is held by the support body 2. The second connecting member 12 includes an annular viscoelastic body 10, a second inner frame member 37 fixed to an end face on the inner circumferential side of the viscoelastic body 10, and a second outer frame member 52 fixed to an end face of the outer circumferential side of the viscoelastic body 10. The viscoelastic body 10 is joined to the second inner frame member 37 and the second outer frame member 52 with stickiness of the viscoelastic body 10 itself. The second inner frame member 37 is fixed to the movable body 3, and the second outer frame member 52 is held by the support body 2.

A gelatinous member formed from silicone gel or the like, natural rubber, diene-based rubber (for example, styrene-butadiene rubber, isoprene rubber, butadiene rubber, chloroprene rubber, and acrylonitrile-butadiene rubber), non-diene rubber (for example, butyl rubber, ethylene-propylene rubber, ethylene-propylene-diene rubber, urethane rubber, silicone rubber, and fluororubber), various rubber materials such as thermoplastic elastomers, and modified materials thereof can be used as the viscoelastic body 10. In addition, the viscoelastic body 10 may be a composite member in which a gelatinous member, rubber, or a modified material thereof and an elastic body such as a spring are combined.

Support Body

The support body 2 includes the case 5 and a coil holder 4 fixed to an inner side of the case 5. As illustrated in FIG. 1 and FIG. 2, the case 5 includes a cylindrical cylinder member 20, a first lid member 21 that closes an opening of the cylinder member 20 on the first direction X1 side in the shaft line direction X, and a second lid member 22 that closes an opening of the cylinder member 20 on the second direction X2 side. The coil holder 4 has a cylindrical shape and is disposed coaxially with the case 5. As illustrated in FIG. 3 and FIG. 4, the coil holder 4 is located between the first lid member 21 and the second lid member 22 on the inner circumferential side of the cylinder member 20. The coil holder 4 holds the coil 62 and holds the first outer frame member 51 of the first connecting member 11.

In addition, the support body 2 includes an annular connecting member holding part 25 protruding from an inner circumferential surface of the cylinder member 20. The connecting member holding part 25 is located between the coil holder 4 and the second lid member 22 in the shaft line direction X. The connecting member holding part 25 holds the second outer frame member 52 of the second connecting member 12.

Cylinder Member, First Lid Member, and Second Lid Member

The cylinder member 20 is made of resin. As illustrated in FIG. 2, the cylinder member 20 includes a cutout part 65 formed by cutting out an edge of the cylinder member 20 on the first direction X1 side in the shaft line direction X toward the second direction X2. In addition, the cylinder member 20 includes a board holding part 69 on the second direction X2 side of the cutout part 65. A wiring board 7 is fixed to the board holding part 69. A lead wire 8 for power supply is electrically connected to the wiring board 7. A lead wire holding part 70 holding the lead wire 8 is provided in the position circumferentially adjacent to the wiring board 7. The lead wire 8 is connected to the coil 62 via the wiring board 7.

The first lid member 21 is made of resin. The first lid member 21 includes a circular first end plate part 211, and an annular first side plate part 212 extending from the outer circumferential edge of the first end plate part 211 toward the second direction X2. The first end plate part 211 includes, on an inner circumferential side of the first side plate part 212, an annular rib 213 protruding toward the second direction X2. The rib 213 is coaxial with the first side plate part 212. A plurality of protruding parts 214 protruding toward the second direction X2 are provided at equal angular intervals on an end face of the rib 213 on the second direction side. In the present example, three protruding parts 214 are provided. A cover part 66 protruding toward the second direction X2 is provided in a portion in the circumferential direction of the first side plate part 212.

As illustrated in FIG. 1, the first lid member 21 is inserted into the cylinder member 20 from the first direction X1 side and fixed to an end portion of the cylinder member 20 on the first direction X1 side. The cover part 66 is inserted into the cutout part 65 from the first direction X1 side when the first lid member 21 is inserted into the cylinder member 20 from the first direction X1 side. A gap which is formed between the cutout part 65 and an edge on the second direction X2 side of the cover part 66 when the cover part 66 is inserted into the cutout part 65 is a wiring pullout part 60 from which a coil wire 63 of the coil 62 is pulled out to the outside of the case 5.

Here, a plurality of fixing parts 27 fixing the first lid member 21 and the cylinder member 20 with predetermined strength are provided in the circumferential direction between the first lid member 21 and the cylinder member 20. In the present example, three fixing parts 27 are provided at equal angular intervals. Details of each fixing part 27 will be described later.

The second lid member 22 is made of resin. The second lid member 22 includes a circular second end plate part 221, and an annular second side plate part 222 extending from the outer circumferential edge of the second end plate part 221 toward the first direction X1. As illustrated in FIG. 3 and FIG. 4, the second lid member 22 includes an annular rib 223 in the second end plate part 221. The rib 223 is coaxial with the second side plate part 222 and protrudes toward the first direction X1. Three protruding parts 224 protruding toward the first direction X1 are provided at equal angular intervals on an end face of the rib 223 on the second direction side.

The second lid member 22 is inserted into the cylinder member 20 from the second direction X2 side and fixed to an end portion of the cylinder member 20 on the second direction X2 side. Three fixing parts 27 fixing the second lid member 22 and the cylinder member 20 with predetermined strength are provided at equal angular intervals in the circumferential direction between the second lid member 22 and the cylinder member 20. Each fixing part 27 has the same configuration as the fixing parts 27 provided between the first lid member 21 and the cylinder member 20.

Coil Holder

As illustrated in FIG. 2, the coil holder 4 includes a coil holding portion 40 holding the coil 62, and a connecting member holding portion 41 holding the first outer frame member 51 of the first connecting member 11 on the first direction X1 side of the coil holding portion 40. As illustrated in FIG. 3 and FIG. 4, the coil 62 held by the coil holding portion 40 is located in the central portion in the shaft line direction X within the case 5.

The connecting member holding portion 41 has an annular shape. An inner circumferential surface of the connecting member holding portion 41 is provided with an annular first recessed part 43 cut out from the first direction X1 and the inner circumferential side. An end portion on the second direction X2 side of the first recessed part 43 is provided with a first step 44. The first outer frame member 51 of the first connecting member 11 is press-fitted into the first recessed part 43 from the first direction X1 side. During press-fitting, the first step 44 abuts on the first outer frame member 51 from the second direction X2 side and positions the first outer frame member 51 in the shaft line direction X. The coil holder 4 holds the first outer frame member 51 of the first connecting member 11 from the outer circumferential side and the second direction X2 side thereby.

As illustrated in FIG. 2 and FIG. 3, two terminal pins 63 protrude toward the outer circumferential side from an outer circumferential surface of the connecting member holding portion 41. An end part of the coil wire 63 pulled out from the coil 62 is tied to the two terminal pins 64. When the coil holder 4 is fixed to the case 5, the two terminal pins 64 protrude toward the outside of the case 5 via the wiring pullout part 60. As illustrated in FIG. 1, FIG. 2, and FIG. 3, the two terminal pins 64 protruding toward the outside of the case 5 penetrate two holes 71 provided on the wiring board 7 and are electrically connected to lands provided to edges of the holes 71. The coil wire 63 and the lead wire 8 for power supply are electrically connected thereby.

As illustrated in FIG. 3 and FIG. 4, when the first lid member 21 is fixed to the cylinder member 20, the protruding parts 214 of the first lid member 21 abut on the first outer frame member 51 from the first direction X1 side. That is, the protruding parts 214 of the first lid member 21 are abutting parts abutting on the first outer frame member 51 from the first direction X1 side. When the first lid member 21 is fixed to the cylinder member 20, the first lid member 21 prevents the first outer frame member 51 from moving toward the first direction X1. In addition, the first lid member 21 prevents the viscoelastic body 10 of the first connecting member 11 from being exposed to the outside.

Connecting Member Holding Part

The connecting member holding part 25 is located on the second direction X2 side of the coil holder 4. The connecting member holding part 25 has an annular shape. An inner circumferential surface of the connecting member holding part 25 is provided with an annular second recessed part 43 cut out from the second direction X2 side and the inner circumferential side. An end portion on the first direction X1 side of the second recessed part 46 is provided with a second step 45. The second outer frame member 52 of the second connecting member 12 is press-fitted into the second recessed part 46 from the second direction X2 side. During press-fitting, the second step 45 abuts on the second outer frame member 52 from the first direction X1 side and positions the second outer frame member 52 in the shaft line direction X. The connecting member holding part 25 holds the second outer frame member 52 of the second connecting member 12 from the outer circumferential side and the first direction X1 side thereby.

When the second lid member 22 is fixed to the cylinder member 20, the protruding parts 214 of the second lid member 22 abut on the second outer frame member 52 from the second direction X2 side. That is, the protruding parts 214 of the second lid member 22 are abutting parts abutting on the second outer frame member 52 from the second direction X2 side. When the second lid member 22 is fixed to the cylinder member 20, the second lid member 22 prevents the second outer frame member 52 from moving toward the second direction X2. In addition, the second lid member 22 prevents the viscoelastic body 10 of the second connecting member 12 from being exposed to the outside.

Movable Body

As illustrated in FIG. 2 to FIG. 4, the movable body 3 has a support shaft 30 extending in the shaft line direction X at the center in the radial direction of the support body 2. The support shaft 30 is a round rod made of metal. The shaft line of the support shaft 30 is the shaft line of the movable body 3 and coincides with the shaft line L of the case 5. The magnet 61 is supported by the support shaft 30. The magnet 61 includes, at the center thereof, a shaft hole 610 through which the support shaft 30 penetrates.

In addition, a yoke 35 is supported by the support shaft 30. The yoke 35 includes a first yoke 31 overlapping with the magnet 61 on the first direction X1 side in the shaft line direction X, and a second yoke 32 overlapping with the magnet 61 on the second direction X2 side.

The first yoke 31 has a disk shape with a predetermined thickness. The first yoke 31 includes, at the center thereof, a shaft hole 310 through which the support shaft 30 penetrates. The first yoke 31 is fixed to a surface on the first direction X1 side of the magnet 61 through adhesion or other means. Here, the outer diameter dimension of the first yoke 31 is larger than the outer diameter dimension of the magnet 61. Accordingly, an outer circumferential surface of the first yoke 31 projects outward in the radial direction beyond an outer circumferential surface of the magnet 61.

The second yoke 32 includes two members: a cup-shaped first magnetic member 33 and a disc-shaped second magnetic member 34. The first magnetic member 33 includes: a circular end plate part 331 that includes, at the center thereof, a shaft hole 330 through which the support shaft 30 penetrates; a bent part 332 that is bent toward the first direction X1 from an outer edge of the end plate part 331; and a cylindrical part 333 that extends from the bent part 332 toward the first direction X1. The end plate part 331 of the first magnetic member 33 is fixed to an end face on the second direction X2 side of the magnet 61. The second magnetic member 34 includes, at the center thereof, a shaft hole 340 through which the support shaft 30 penetrates. The second magnetic member 34 is fixed to the end plate part 331 of the first magnetic member 33 from the opposite side of the magnet 61. As illustrated in FIG. 2, the second magnetic member 34 is provided with, on the outer circumferential side of the shaft hole 340, a plurality of through-holes penetrating in the shaft line direction X. Each through-hole is a weight adjusting part 38 for adjusting the weight of the movable body 3.

As illustrated in FIG. 3 and FIG. 4, the first inner frame member 36 of the first connecting member 11 is fixed to the support shaft 30 on the first direction X1 side of the first yoke 31. More specifically, an inner circumferential surface of the first inner frame member 36 is provide with, in an end part on the second direction X2 side, an annular protruding part 361 protruding radially inward, and the support shaft 30 is press-fitted into the central hole of the annular protruding part 361. Consequently, the first inner frame member 36 is fixed to the support shaft 30.

In addition, the second inner frame member 37 of the second connecting member 12 is fixed to the support shaft 30 from the second direction X2 side of the second yoke 32. More specifically, an inner circumferential surface of the second inner frame member 37 is provide with, in an end part on the first direction X1 side, an annular protruding part 371 protruding radially inward, and the support shaft 30 is press-fitted into the central hole of the annular protruding part 371. Consequently, the second inner frame member 37 is fixed to the support shaft 30.

When the first inner frame member 36 and the second inner frame member 37 are fixed to the support shaft 30, the first inner frame member 36 abuts on the first yoke 31 from the first direction X1 side. In addition, the second inner frame member 37 abuts on the second magnetic member 34 from the second direction X2 side. Accordingly, the magnet 61 and the yoke 35 supported by the support shaft 30 are fixed to the support shaft 30 from the both sides in the shaft line direction X by the first inner frame member 36 and the second inner frame member 37.

When the magnet 61 and the yoke 35 are supported by the support shaft 30, the magnet 61 and the yoke 35 are located in a central portion of the support shaft 30 in the shaft line direction X. In addition, the cylindrical part 333 of the second yoke 32 is located radially outward from the outer circumferential surface of the magnet 61 and the first yoke 31 in a position radially separated toward the outside from the outer circumferential surface of the magnet 61 and the outer circumferential surface of the first yoke 31. Here, when the support body 2 and the movable body 3 are connected via the first connecting member 11 and the second connecting member, part of the coil 62 of the movable body 3 is located between the cylindrical part 333 of the second yoke 32 and the outer circumferential surface of the magnet 61. In addition, part of the coil 62 of the movable body 3 is located between the cylindrical part 333 of the second yoke 32 and the outer circumferential surface of the first yoke 31.

Operation of Actuator

In the actuator 1, energization of the coil 62 causes the magnetic drive mechanism 6 to generate driving power for driving the movable body 3 in the shaft line direction X. When the coil 62 is deenergized, the movable body 3 returns to an original position by restoring force of the viscoelastic body 10. Accordingly, the movable body 3 vibrates in the shaft line direction X by intermittently energizing the coil 62. In addition, acceleration at which the movable body 3 moves toward the first direction X1 of the shaft line direction X can be made different from acceleration at which the movable body 3 moves toward the second direction X2 by adjusting the alternating waveform applied to the coil 62. Accordingly, a user who holds a device to which the actuator 1 is attached as a tactile device can feel a sense of vibration with directionality in the shaft line direction X. The actuator 1 can also be used to configure a speaker.

Fixing Part

Figure 5:
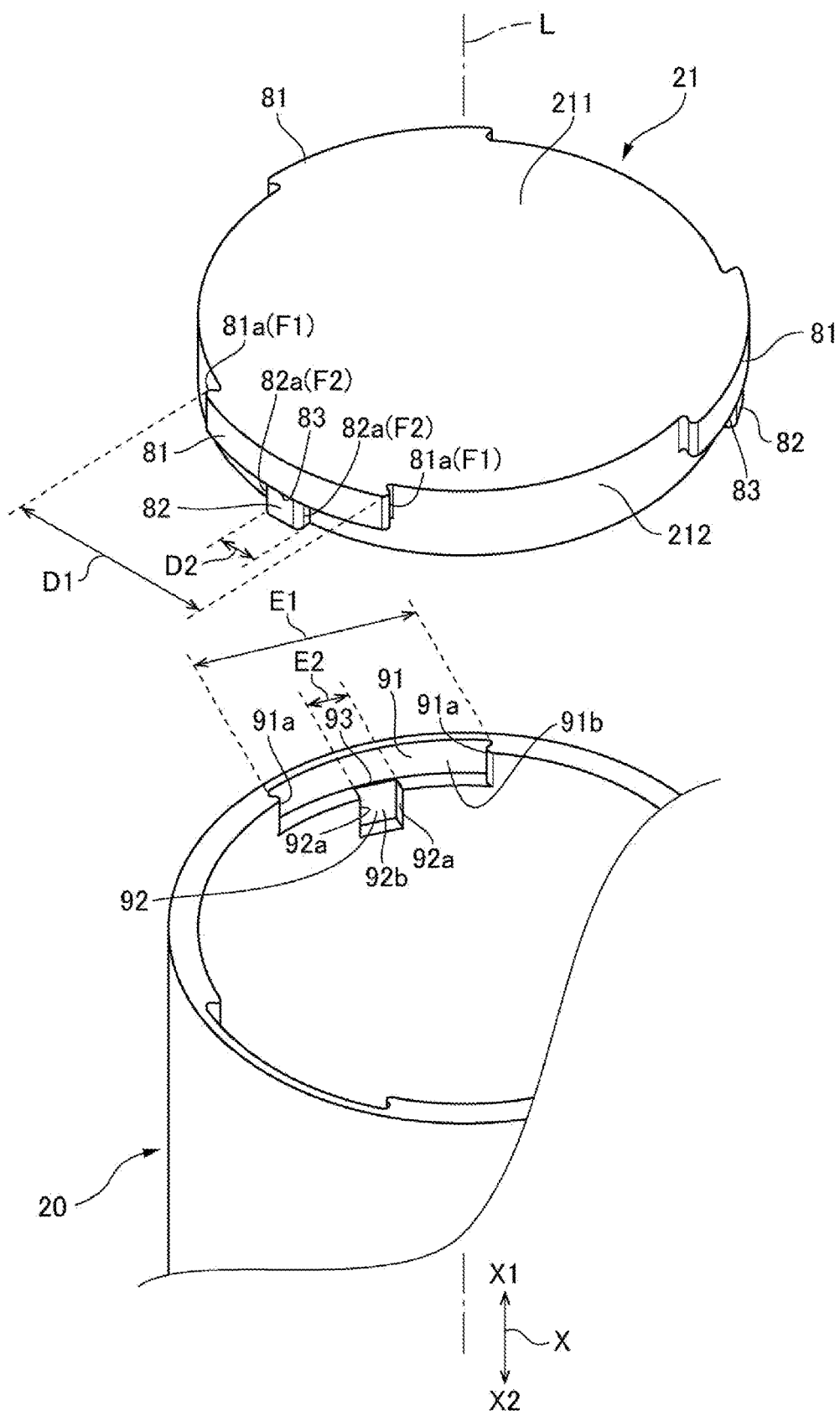
FIG. 5 is a view illustrating a fixing part.

Next, the fixing part 27 fixing the cylinder member 20 and the first lid member 21 will be described in detail. FIG. 5 is a view illustrating the fixing part 27. Note that the fixing part 27 fixing the second lid member 22 and the cylinder member 20 is the same as the fixing part 27 fixing the first lid member 21 and the cylinder member 20. Accordingly, the fixing part 27 fixing the first lid member 21 and the cylinder member 20 will be described, and description for the fixing part 27 fixing the second lid member 22 and the cylinder member 20 is omitted.

As illustrated in FIG. 1, the first lid member 21 and the cylinder member 20 include the fixing parts 27 at three locations in the circumferential direction around the shaft line L. The three fixing parts 27 are provided at equal angular intervals. Each of the fixing parts 27 has the same configuration.

As illustrated in FIG. 5, each of the fixing parts 27 includes a first protrusion 81 protruding toward the outer circumferential side from a portion in the circumferential direction of the first side plate part 212 of the first lid member 21, and a second protrusion 82 protruding toward the outer circumferential side from a portion in the circumferential direction of the first lid member 21 on the second direction X2 side of the first protrusion 81. In addition, each of the fixing parts 27 includes a first recessed part 91 which is provided on an inner circumferential surface of the cylinder member 20 and into which the first protrusion 81 is inserted, and a second recessed part 92 which is provided on the inner circumferential surface of the cylinder member 20 and into which the second protrusion 82 is inserted. The first protrusion 81 is inserted into the first recessed part 91 from the first direction X1 side. The second protrusion 82 is inserted into the second recessed part 92 from the first direction X1 side.

The first protrusion 81 includes a pair of first end faces 81a located on both sides in the circumferential direction. The second protrusion 82 includes a pair of second end faces 82a located on both sides in the circumferential direction. A first protrusion width dimension D1 between the pair of first end faces 81a in the circumferential direction is larger than a second protrusion width dimension D2 between the pair of second end faces 82a in the circumferential direction. When viewed from the shaft line direction X, the first protrusion 81 and the second protrusion 82 overlap, and the second protrusion 82 is located inside the first protrusion 81 in the circumferential direction. In the present example, the second protrusion 82 is located in a central portion in the circumferential direction of the first protrusion 81. Each of the first end faces 81a of the first protrusion 81 is located in a position different from each of the second end faces 82a of the second protrusion 82 in the circumferential direction.

In addition, the first protrusion 81 protrudes toward the outer circumferential side further from the second protrusion 82. Accordingly, a protrusion-side step 83 including an end face facing the second direction X2 is provided between the first protrusion 81 and the second protrusion 82.

Here, each of the first end faces 81a is a curved surface when viewed from the shaft line direction X. In the present example, each of the first end faces 81a is a surface curved in an S-shape when viewed from the shaft line direction X.

The first recessed part 91 includes, on an inner wall surface thereof, a pair of first side walls 91a facing each other in the circumferential direction and an arc-shaped first circumferential wall 91b extending along the circumferential direction between the pair of first side walls 91a. The first circumferential wall 91b faces the radially inner side of the cylinder member 20. The second recessed part 92 includes, on an inner wall surface thereof, a pair of second side walls 92a facing each other in the circumferential direction and an arc-shaped second circumferential wall 92b extending along the circumferential direction between the pair of first side walls 91a. The second circumferential wall 92b faces the radially inner side of the cylinder member 20. The first recessed part 91 and the second recessed part 92 overlap when viewed from the shaft line direction X, and an end of the second recessed part 92 on the first direction X1 side communicates with a central portion in the circumferential direction of the first recessed part 91. Accordingly, each of the first side walls 91a of the first recessed part 91 is located in a position different from each of the second side walls 92a of the second recessed part 92 in the circumferential direction.

In addition, the first recessed part 91 is more deeply recessed toward the outer circumferential side than the second protrusion 82. Accordingly, the first circumferential wall 91b is located radially outward from the second circumferential wall 92b. Therefore, a groove-side step 93 including an end face facing the first direction X1 is provided between the first recessed part 91 and the second recessed part 92.

Here, each of the first side walls 91a is a transferred surface having a shape of the curved surface of the first protrusion 81 transferred. Accordingly, each of the first side walls 91a is a curved surface and has an S-shape when viewed from the shaft line direction X.

When the first lid member 21 is fixed to the cylinder member 20, the pair of first end faces 81a of the first protrusion 81 is in contact with the pair of first side walls 91a of the first recessed part 91, respectively, and the pair of second end faces 82a of the second protrusion 82 is in contact with the pair of second side walls 92a of the second recessed part 92 facing each other in the circumferential direction, respectively. A first contact area F1 in which each of the first end faces 81a is in contact with the corresponding first side wall 91a is larger than a second contact area F2 in which each of the second end faces 82a is in contact with the corresponding second side wall 92a.

Here, before the first protrusion 81 is inserted into the first recessed part 91, the first protrusion width dimension D1 of the first protrusion 81 is larger than a first recessed part width dimension E1 of the first recessed part 91 between the pair of first side walls 91a in the circumferential direction. In addition, the second protrusion width dimension D2 of the second protrusion 82 is larger than a second recessed part width dimension E2 of the second recessed part 92 between the pair of second side walls 92a in the circumferential direction. A first press-fit margin obtaining by subtracting the first recessed part width dimension E1 from the first protrusion width dimension D1 is equal to or less than a second press-fit margin obtaining by subtracting the second recessed part width dimension E2 from the second protrusion width dimension D2. In the present example, the first press-fit margin is 0.05 mm to 0.1 mm. The second press-fit margin is 0.1 mm to 0.2 mm.

Function Effect

In the present example, the first lid member 21 is provided with the first protrusion 81 and the second protrusion 82 protruding toward the outer circumferential side, and the first recessed part 91 into which the first protrusion 81 is inserted and the second recessed part 92 into which the second protrusion 82 is inserted are provided on the inner circumferential surface of the cylinder member 20. In addition, before the first protrusion 81 is inserted into the first recessed part 91, the first protrusion width dimension D1 of the first protrusion 81 is larger than the first recessed part width dimension E1 of the first recessed part 91, and the second protrusion width dimension D2 of the second protrusion 82 is larger than the second recessed part width dimension E2 of the second recessed part 92. Accordingly, when the first lid member 21 is inserted into the cylinder member 20 to fix same, the first protrusion 81 is press-fitted into the first recessed part 91, and the second protrusion 82 is press-fitted into the second recessed part 92, in each of the fixing parts 27. Accordingly, the plurality of fixing parts 27 makes it possible to provide strength enough to prevent the first lid member 21 from dropping out of the cylinder member 20.

In addition, each of the fixing parts 27 is provided with two press-fit portions. Accordingly, even in a case where the first protrusion 81 or the second protrusion 82 is broken due to external impact, and the number of press-fit portions becomes one, the first lid member 21 is prevented from dropping out of the cylinder member 20.

Furthermore, the first contact area F1 in which the first end faces 81a of the first protrusion 81 are in contact with the first side walls 91a of the first recessed part 91 is larger than the second contact area F2 in which the second end faces 82a of the second protrusion 82 are in contact with the second side walls 92a of the second recessed part 92. Consequently, frictional force between the first end faces 81a of the first protrusion 81 and the first side walls 91a of the first recessed part 91 increases, making it easier to prevent the first lid member 21 from falling out of the cylinder member 20.

Here, the actuator 1 has the following problem: when vibration of the movable body 3 is transmitted to the first lid member 21 via the first connecting member 11, the first lid member 21 rotates around the shaft line L due to vibration, and the first lid member 21 easily drops out of the cylinder member 20. On the other hand, in the present example, the first contact area F1 in which the first end faces 81a of the first protrusion 81 are in contact with the first side walls 91a of the first recessed part 91 is larger than the second contact area F2 in which the second end faces 82a of the second protrusion 82 are in contact with the second side walls 92a of the second recessed part 92. Accordingly, the contact between the first end faces 81a of the first protrusion 81 and the first side walls 91a of the first recessed part 91 can prevent the first lid member 21 from rotating relative to the cylinder member 20. Therefore, the first lid member 21 can be prevented from easily dropping out of the cylinder member 20.

In addition, in each of the fixing parts 27, in the case where the first end faces 81a of the first protrusion 81 and the second end faces 82a of the second protrusion 82 overlap, and the first side walls 91a of the first recessed part 91 and the second side walls 92a of the second recessed part 92 overlap, when viewed from the shaft line direction X, the first end faces 81a of the first protrusion 81 and the second end faces 82a of the second protrusion 82 are aligned on a straight line in the shaft line direction X, and the first side walls 91a of the first recessed part 91 and the second side walls 92a of the second recessed part 92 are aligned on a straight line in the shaft line direction X. In this case, there is the following problem: when force in the shaft line direction X is applied to the first lid member 21, the first protrusion 81 and the second protrusion 82 easily fall out of the first recessed part 91 and the second recessed part 92 in the shaft line direction X, respectively. On the other hand, in the present example, each of the first end faces 81a is located in a position different from each of the second end faces 82a in the circumferential direction, and each of the first side walls 91a is located in a position different from each of the second side walls 92a in the circumferential direction. Accordingly, the first end faces 81a of the first protrusion 81 and the second end faces 82a of the second protrusion 82 are not aligned on a straight line in the shaft line direction X, and the first side walls 91a of the first recessed part 91 and the second side walls 92a of the second recessed part 92 are not aligned on a straight line in the shaft line direction X. Therefore, the first lid member 21 is easily prevented from dropping out of the cylinder member 20.

In the present example, the second protrusion 82 overlaps with the first protrusion 81 when viewed from the shaft line direction X. Accordingly, when the first lid member 21 is fixed to the cylinder member 20, by pushing into the respective fixing parts 27 toward the second direction X2, the first protrusion 81 can be press-fitted into the first recessed part 91, and the second protrusion 82 can be press-fitted into the second recessed part 92. In addition, when viewed from the first direction X1 side, the second protrusion 82 is buried by the first protrusion 81. Accordingly, the second protrusion 82 and the second recessed part 92 into which the second protrusion 82 has been inserted can be buried by the first protrusion 81 when viewed from the first direction X1 side in the state where the first lid member 21 is fixed to the cylinder member 20.

In addition, the first protrusion 81 protrudes toward the outer circumferential side further from the second protrusion 82, and the first recessed part 91 is more deeply recessed toward the outer circumferential side than the second recessed part 92. Accordingly, the first contact area F1 in which the first end faces 81a of the first protrusion 81 in the circumferential direction are in contact with the first side walls 91a of the first recessed part 91 can be made larger than the second contact area F2 in which the second end faces 82a of the second protrusion 82 in the circumferential direction are in contact with the second side walls 92a of the second recessed part 92. Consequently, frictional force between the first end faces 81a of the first protrusion 81 and the first side walls 91a of the first recessed part 91 increases, making it easier to prevent the first lid member 21 from falling out of the cylinder member 20. In addition, since the first contact area F1 in which the first end faces 81a of the first protrusion 81 are in contact with the first side walls 91a of the first recessed part 91 is increased, the first lid member 21 can be prevented from rotating relative to the cylinder member 20 when vibration of the movable body 3 is transmitted to the first lid member 21.

Furthermore, in the present example, since the first protrusion 81 protrudes toward the outer circumferential side further from the second protrusion 82, a protrusion-side step 83 including an end face facing the second direction X2 is formed between the first protrusion 81 and the second protrusion 82. Meanwhile, since the first recessed part 91 is more deeply recessed toward the outer circumferential side than the second recessed part 92, the groove-side step 93 including an end face facing the first direction X1 is formed between the first recessed part 91 and the second recessed part 92. Accordingly, when each of the fixing parts 27 is pushed toward the second direction X2 so as to fix the first lid member 21 to the cylinder member 20, the protrusion-side step 83 abuts on the groove-side step 93 in the shaft line direction X. Therefore, when the first lid member 21 is fixed to the cylinder member 20, the first lid member 21 can be positioned in the shaft line direction X.

In addition, in the present example, each of the first end faces 81a is a curved surface when viewed from the shaft line direction X, and each of the first side walls 91a is a transferred surface having a shape of the curved surface transferred. Accordingly, the first contact area F1 in which the first end faces 81a of the first protrusion 81 are in contact with the first side walls 91a of the first recessed part 91 can be made larger than the second contact area F2 in which the second end faces 82a of the second protrusion 82 are in contact with the second side walls 92a of the second recessed part 92. Consequently, frictional force between the first end faces 81a of the first protrusion 81 and the first side walls 91a of the first recessed part 91 increases, making it easier to prevent the first lid member 21 from falling out of the cylinder member 20. In addition, since the first contact area F1 in which the first end faces 81a of the first protrusion 81 are in contact with the first side walls 91a of the first recessed part 91 is increased, the first lid member 21 can be prevented from rotating relative to the cylinder member 20 when vibration of the movable body 3 is transmitted to the first lid member 21.

Furthermore, in the present example, the first press-fit margin obtaining by subtracting the first recessed part width dimension E1 from the first protrusion width dimension D1 is equal to or less than the second press-fit margin obtaining by subtracting the second recessed part width dimension E2 from the second protrusion width dimension D2. Accordingly, strength greater than that between the first protrusion 81 and the first recessed part 91 can be ensured between the second protrusion 82 and the second recessed part 92 by press-fitting the second protrusion 82 into the second recessed part 92 apart from the opening end of the cylinder member 20. Consequently, the first lid member 21 hardly drops out of the cylinder member 20. In addition, since the first press-fit margin is equal to or less than the second press-fit margin, deformation of the opening end of the cylinder member 20 caused when the first protrusion 81 is press-fitted into the first recessed part 91 provided on the side closer to the opening end of the cylinder member 20 can be prevented or suppressed.

In the present example, three fixing parts 27 are provided at equal angular intervals. Accordingly, the plurality of fixing parts 27 makes it easier to ensure strength enough to prevent the first lid member 21 from dropping out of the cylinder member 20.

In addition, in the present example, the actuator 1 includes the coil holder 4 fixed to the inside of the case 5. The first connecting member 11 includes the annular viscoelastic body 10 disposed coaxially with the case 5, the first inner frame member 36 fixed to an end face on the inner circumferential side of the viscoelastic body 10, and the first outer frame member 51 fixed to an end face on the outer circumferential side of the viscoelastic body 10. The coil holder 4 holds the first outer frame member 51 from the outside in the radial direction and from the second direction X2 side. The first inner frame member 36 is connected to the movable body 3. A first abutting part 28 provided on the first lid member 21 abuts on the first outer frame member 51 from the first direction X1 side. Accordingly, the first outer frame member 51 can be held, by the first lid member 21 and the coil holder 4 constituting the support body 2 so that the first outer frame member 51 cannot move in the shaft line direction X. In addition, the first lid member 21 can prevent the viscoelastic body 10 from being exposed to the outside of the case 5.

Incidentally, when the cylinder member 20 and the first lid member 21 are made of resin, the hardness of the cylinder member 20 is desirably equal to or greater than the hardness of the first lid member 21. In this configuration, change in the outer diameter dimension of the cylinder member 20 caused when the first protrusion 81 and the second protrusion 82 of the first lid member 21 are inserted into the first recessed part 91 and the second recessed part 92 of the cylinder member 20 can be prevented or suppressed.

Variations

The first protrusion 81 and the second protrusion 82 provided on the second direction X2 side of the first protrusion 81 may be formed in positions different from each other in the circumferential direction. In this case, the first recessed part 91 and the second recessed part 92 are provided in positions different from each other in the circumferential direction. In addition, the second recessed part 92 extends in the shaft line direction X from the opening end of the cylinder member 20.

In addition, the pair of first end faces 81a of the first protrusion 81 may be flat. Furthermore, two fixing parts 27 or four or more fixing parts 27 may be provided in the circumferential direction.

The invention claimed is:

1. An actuator comprising:
   a case provided with a cylinder member and a lid member that is inserted into the cylinder member and closes one opening in a shaft line direction of the cylinder member;
   a movable body housed in the case;
   a connecting member connecting the movable body and the case such that the movable body and the case are allowed to relatively move in the shaft line direction; and a magnetic drive mechanism vibrating the movable body in the shaft line direction relative to the case, wherein the case includes a plurality of fixing parts fixing the lid member to the cylinder member;

when one side of the shaft line direction is taken as a first direction, and the other side of the shaft line direction is taken as a second direction, the lid member includes an abutting part abutting on the connecting member from the first direction side;

each fixing part includes a first protrusion protruding toward an outer circumferential side from a portion of the lid member in a circumferential direction, a second protrusion which is on the second direction side of the first protrusion and protrudes toward the outer circumferential side from a portion of the lid member in the circumferential direction, a first recessed part which is provided on an inner circumferential surface of the cylinder member and into which the first protrusion is inserted, and a second recessed part which is provided on the inner circumferential surface of the cylinder member and into which the second protrusion is inserted;

a pair of first end faces located on respective sides in the circumferential direction of the first protrusion are in contact with a pair of first side walls of the first recessed part facing in the circumferential direction, respectively;

a pair of second end faces located on respective sides in the circumferential direction of the second protrusion are in contact with a pair of second side walls of the second recessed part facing in the circumferential direction, respectively;

a first contact area in which the first end faces are respectively in contact with the first side walls is larger than a second contact area in which the second end faces are respectively in contact with the second side walls; and before the first protrusion is inserted into the first recessed part, a first protrusion width dimension between the pair of first end faces in the circumferential direction is larger than a first recessed part width dimension between the pair of side walls in the circumferential direction, and a second protrusion width dimension between the pair of second end faces in the circumferential direction is larger than a second recessed part width dimension between the pair of second side walls in the circumferential direction.

2. The actuator according to claim 1, wherein the first end faces and the second end faces are located in positions different from each other in the circumferential direction, and the first side walls and the second side walls are located in positions different from each other in the circumferential direction.

3. The actuator according to claim 2, wherein the first protrusion width dimension is longer than the second protrusion width dimension, the first recessed part width dimension is longer than the second recessed part width dimension, when viewed from the shaft line direction, the second protrusion is located on an inner side of the first protrusion in the circumferential direction, and the second recessed part is located in the second direction of the first recessed part and communicates with the first recessed part in the shaft line direction.

4. The actuator according to claim 3, wherein a first press-fit margin obtaining by subtracting the first recessed part width dimension from the first protrusion width dimension is equal to or less than a second press-fit margin obtaining by subtracting the second recessed part width dimension from the second protrusion width dimension.

5. The actuator according to claim 3, wherein the first protrusion protrudes on an outer circumferential side than the second protrusion, and the first recessed part is more deeply recessed toward an outer circumferential side than the second recessed part.

6. The actuator according to claim 3, wherein each first end face is a curved surface when viewed from the shaft line direction, and each first side wall is a transferred surface having a shape of the curved surface transferred.

7. The actuator according to claim 3, wherein three or more fixing parts are provided at equal angular intervals.

8. The actuator according to claim 2, wherein a first press-fit margin obtaining by subtracting the first recessed part width dimension from the first protrusion width dimension is equal to or less than a second press-fit margin obtaining by subtracting the second recessed part width dimension from the second protrusion width dimension.

9. The actuator according to claim 2, wherein the first protrusion protrudes on an outer circumferential side than the second protrusion, and the first recessed part is more deeply recessed toward an outer circumferential side than the second recessed part.

10. The actuator according to claim 2, wherein each first end face is a curved surface when viewed from the shaft line direction, and each first side wall is a transferred surface having a shape of the curved surface transferred.

11. The actuator according to claim 2, wherein three or more fixing parts are provided at equal angular intervals.

12. The actuator according to claim 1, wherein a first press-fit margin obtaining by subtracting the first recessed part width dimension from the first protrusion width dimension is equal to or less than a second press-fit margin obtaining by subtracting the second recessed part width dimension from the second protrusion width dimension.

13. The actuator according to claim 12, wherein the first protrusion protrudes on an outer circumferential side than the second protrusion, and the first recessed part is more deeply recessed toward an outer circumferential side than the second recessed part.

14. The actuator according to claim 12, wherein each first end face is a curved surface when viewed from the shaft line direction, and each first side wall is a transferred surface having a shape of the curved surface transferred.

15. The actuator according to claim 12, wherein three or more fixing parts are provided at equal angular intervals.

16. The actuator according to claim 1, wherein the first protrusion protrudes on an outer circumferential side than the second protrusion, and the first recessed part is more deeply recessed toward an outer circumferential side than the second recessed part.

17. The actuator according to claim 16, wherein each first end face is a curved surface when viewed from the shaft line direction, and each first side wall is a transferred surface having a shape of the curved surface transferred.

18. The actuator according to claim 1, wherein
each first end face is a curved surface when viewed from the shaft line direction, and
each first side wall is a transferred surface having a shape of the curved surface transferred.

19. The actuator according to claim 1, wherein three or more fixing parts are provided at equal angular intervals.

20. The actuator according to claim 1, wherein
a holder fixed to an inside of the case is provided,
the connecting member includes an annular viscoelastic body spreading in a radial direction, an inner frame member fixed to an end face on an inner circumferential side of the viscoelastic body, and an outer frame member fixed to an end face on an outer circumferential side of the viscoelastic body,
the holder holds the outer frame member from the outer circumferential side and from a side in the second direction,
the inner frame member is connected to the movable body, and
the abutting part abuts on the outer frame member.

\* \* \* \* \*